(12) United States Patent
Bruce

(10) Patent No.: US 7,373,727 B2
(45) Date of Patent: May 20, 2008

(54) ADJUSTABLE ANGLE AND MITER FINDER

(76) Inventor: Theodore M. Bruce, 1002-B Old Turkey Point Rd., Edgewater, MD (US) 21037

( * ) Notice: Subject to any disclaimer, the term of this patent is extended or adjusted under 35 U.S.C. 154(b) by 71 days.

(21) Appl. No.: 11/391,130

(22) Filed: Mar. 28, 2006

(65) Prior Publication Data

US 2007/0227022 A1    Oct. 4, 2007

(51) Int. Cl.
*B43L 7/10* (2006.01)
(52) U.S. Cl. .................... 33/455; 33/471; 33/25.1; 33/461
(58) Field of Classification Search .............. 33/455, 33/534, 520, 644, 471, 456, 640
See application file for complete search history.

(56) References Cited

U.S. PATENT DOCUMENTS 1,660,578 A * 2/1928 Reppell ................... 33/455
2,259,619 A * 10/1941 Cooper ..................... 33/455
3,949,481 A * 4/1976 Campbell .................. 33/438
4,527,341 A * 7/1985 Schon ....................... 33/455
6,877,238 B2 * 4/2005 Kanaga ..................... 33/455

* cited by examiner

*Primary Examiner*—Yaritza Guadalupe-McCall
(74) *Attorney, Agent, or Firm*—Raymond M. Galasso; Galasso & Associates, LP

(57) ABSTRACT

An apparatus for determining the angle between two adjacent objects such as the corner of a wall or the pitch of a roof, and the appropriate angle of a corresponding miter cut. The apparatus includes a base member that is configured in a substantially planar manner. The base member includes a channel for slidably receiving the ends of two support members. The support members are pivotally mounted to opposing angle arms that extend laterally in opposing directions from the base member and function to movably connect the angle arms to the base member and form a pointer thereon. The base member further includes numeric indicia that indicate the angle of the angle arms and the corresponding miter angle cut adjacent to the channel on the base member.

12 Claims, 1 Drawing Sheet

ADJUSTABLE ANGLE AND MITER FINDER

FIELD OF THE INVENTION

The present invention relates to an adjustable angle and miter indicator, more specifically but not by way of limitation, to an adjustable angle and miter indicator designed to assist a user in quickly determining the degree of an angle of two adjacent objects and identify the appropriate miter cut needed to replicate the measured angle.

BACKGROUND

Individuals engage in numerous activities where the measuring of angles of two adjacent pieces of material is necessary. Professional contractors and those involved in construction tasks such as applying decorative molding to a house or building the trusses to create a roof support structure often have to join to pieces of suitable material together to form a desired angle.

Individuals must determine the angle needed or measure an existing angle and then calculate the appropriate miter cut needed to create the desired angle. For example, if a desired angle of one hundred and thirty-five degrees is necessary, an individual will need to calculate the inside miter cut necessary whereby upon engagement of the desired material that the outside angle is one hundred and thirty-five degrees. This is usually accomplished by attempting to measure the inside angle as that will be the miter cut needed. A miter cut is typically performed by a miter saw or other suitable device and ranges from zero to ninety degrees.

One problem that currently exists is that while there are many devices and methods available for determining the degree of a certain angle, these methods and devices do not identify without calculation the necessary corresponding miter cut needed to create the measured angle. Users must often engage in calculations to determine the angle required for the miter cut, a task that can often be time consuming for those who do not regularly engage in this type of activity.

Accordingly, there is a need for a device that can measure the degree of an angle of two adjacent objects and simultaneously identify the degree of the miter cut needed to create the measured angle. Furthermore, the device should be adjustable to measure angles between but not limited to zero and one hundred and eighty degrees.

SUMMARY OF THE INVENTION

It is the object of the present invention to provide an adjustable angle finder suitable for determining the degree of the angle either existing or required between two adjacent materials.

A further object of the present invention is to provide an adjustable angle finder suitable for determining the degree of the angle between two adjacent materials that further indicates the degree of miter cut needed on the material to be secured adjacent to each other creating the desired angle.

Another object of the present invention is to provide an adjustable angle finder that will measure angles from zero degrees to one hundred and eighty degrees.

A further object of the present invention is to provide an adjustable angle finder that will include a scale that will indicate the degree of the angle measured and the degree of the miter cut needed adjacently indicated on the scale.

Yet another object of the present invention is to provide an adjustable angle finder that is lightweight and easily portable.

To the accomplishment of the above and related objects the present invention may be embodied in the form illustrated in the accompanying drawing. Attention is called to the fact that the drawing is illustrative only. Variations are contemplated as being part of the present invention, limited only by the scope of the claims.

BRIEF DESCRIPTION OF THE DRAWING

A more complete understanding of the present invention may be had by reference to the following Detailed Description and appended claims when taken in conjunction with the accompanying Drawing wherein:

DETAILED DESCRIPTION

Figure 1:
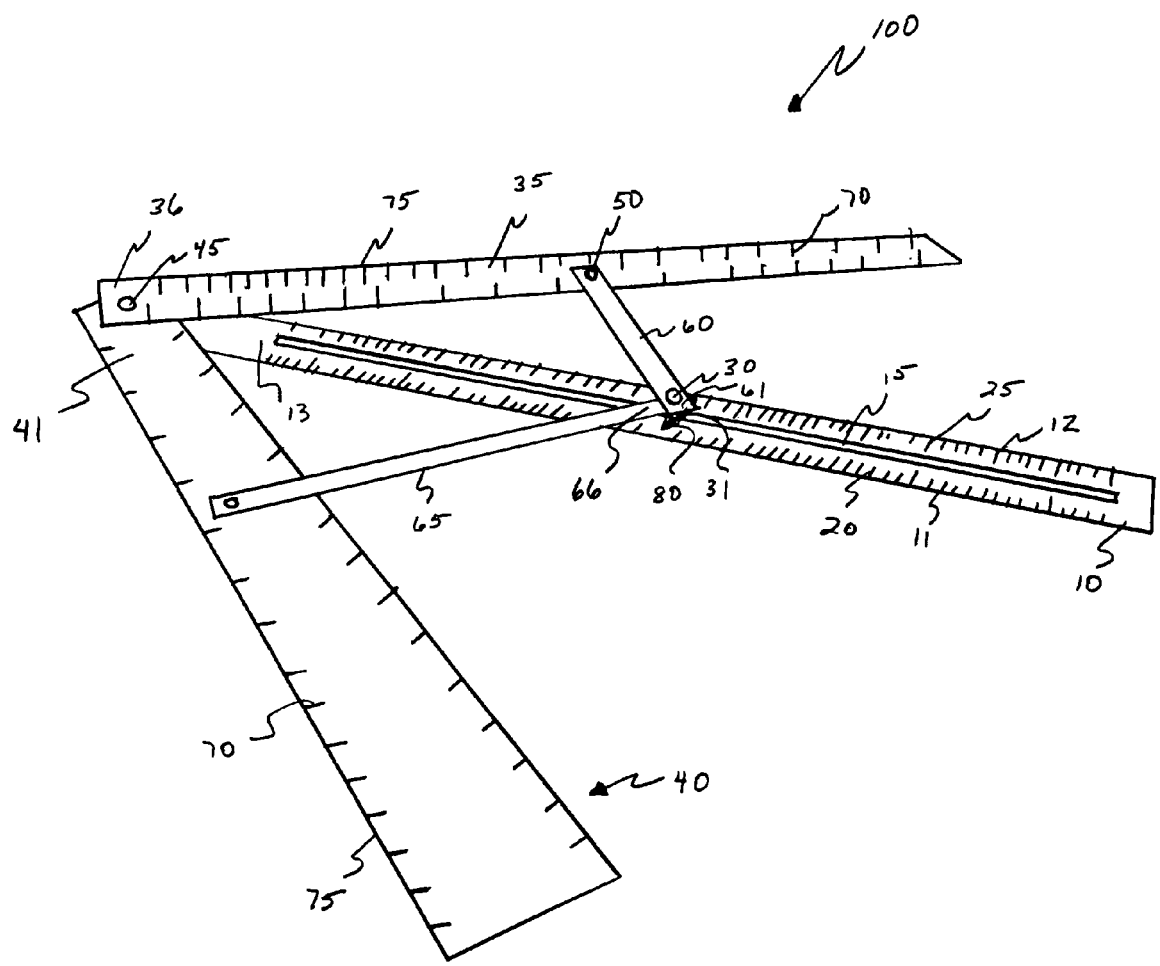
FIG. 1 is a perspective view of an embodiment of the present invention configured to measure interior angles.

Referring now to the drawing wherein various elements depicted therein are not necessarily drawn to scale, and wherein like elements are designated with like reference numerals and in particular FIG. 1, there is illustrated a preferred embodiment of an adjustable angle/miter indicator 100 constructed according to the principles of the present invention.

The adjustable angle/miter indicator 100 comprises a base member 10 configured in a substantially planar manner and is generally rectangular in shape. The base member 10 is constructed of a suitable durable material such as wood, plastic or metal. While no specific length is required for the base member 10, good results have been achieved with a base member 10 that is approximately twelve inches in length.

Superposed along one side of the base member 10 is a plurality of degree indicator markings 20. The degree indicator markings 20 are proximate the left longitudinal edge 11 of the base member 10. Opposite the degree indicator markings 20 are a plurality of miter angle indicator markings 25. The miter angle indicator markings 25 are proximate the right longitudinal edge 12 of the base member 10. Those skilled in the art will recognize that the miter angle indicator markings 25 and the degree indicator markings 20 could be placed on either the left longitudinal edge 11 or the right longitudinal edge 12. It is further contemplated to be within the scope of this invention, that icons could be used in addition to, or in place of degree indicator markings 20. For example, if the measured angle is 72 degrees, an icon of a pentagon would be disposed on base 10 at the corresponding degree indicator marking 20.

Centrally disposed longitudinally in the base member 10 is a channel 15. The channel 15 extends substantially the length of the base member 10 and is configured to receive therein a portion 31 of the coupling 30. The coupling 30 is a conventional mechanical fastener manufactured from a suitable durable material such as metal. The channel 15 is a conventional groove or depression that facilitates the coupling 30 to be slidably engaged with the base member 10. It is further contemplated within the scope of the present invention that the channel 15 is constructed so as to retain therein a portion 31 of the coupling 30 upon engagement with the channel 15.

Angle/miter indicator 100 further includes a right support member 60 and a left support member 65 which extend laterally opposite from each other and are generally flat and rectangular in shape. Right support member 60 includes an end 61 that is superposed and pivotally mounted to the coupling 30. Left support member 65 includes an end 66 that is superposed and pivotally mounted to the coupling 30. The ends 61, 66 are mounted superposed one another on the coupling 30. The right support member 60 and the left support member 65 are manufactured of a suitable durable material such as metal, plastic or wood. Those skilled in the art will recognize that numerous different shapes could be utilized to manufacture the right support member 60 and the left support member 65. More specifically but not by way of limitation the right support member 60 and the left support member 65 could be rod shaped. Positioned at ends 61 and 66 is a pointer 80 which is adjacent the degree indicator markings 20 and the miter angle indicator markings 25. The pointer 80 functions to indicate the measured angle and the appropriate miter cut needed when the right angle arm 35 and the left angle arm 40 have been placed in their desired position.

The right support member 60 is pivotally mounted to the right angle arm 35 opposite the end 61 with a fastener 50. The right support member 60 functions to movably connect the right angle arm 35 to the base member 10 in order to facilitate the measuring of the desired angle. Furthermore, the right support member 60 functions to provide structural support for the adjustable angle/miter indicator 100. The fastener 50 is a conventional mechanical fastener such as but not limited to a rivet. The right angle arm 35 is configured in a substantially horizontal manner and is generally rectangular in shape. The right angle arm 35 is manufactured from a suitable rigid material such as but not limited to plastic, wood or metal. The right angle arm 35 has superposed thereon numeric measurement indicators 70 that can be used to determine the length of any object adjacently placed thereto. Those skilled in the art will recognize that the measurement indicators 70 could be configured in a plurality of systems such as but not limited to the English measurement system or metric measurement system.

One end 36 of the right angle arm 35 is pivotally mounted to one end 13 of the base member 10. The end 36 is mounted via a conventional mechanical pin 45. The pin 45 functions to pivotally secure the end 36 of the right angle arm 35 to the end 13 of the base member 10.

The left support member 65 is pivotally mounted to the left angle arm 40 opposite the end 66 with a fastener 55. The fastener 55 is a conventional mechanical fastener such as but not limited to a rivet. The left support member 65 functions to movably connect the left angle arm 40 to the base member 10 in order to facilitate the measuring of the desired angle. Furthermore, the left support member 65 functions to provide structural support for the adjustable angle/miter indicator 100. The left angle arm 40 is configured in a substantially planar manner and is generally rectangular in shape and is manufactured from a suitable durable material such as but not limited to plastic, wood or metal.

One end 41 of the left angle arm 40 is pivotally mounted to the end 13 of the base member 10 superposed the end 36 of right angle arm 35 with the pin 45. Those skilled in the art will recognize that either end 41 or 36 could be superposed each other when pivotally mounted to the base member 10 with the coupling 30.

Superposed on the left angle arm 40 are numeric measurement indicators 70 that facilitate the measurement of any object placed adjacent thereto. It is further contemplated within the scope of the present invention that the angle/miter indicator 100 could be constructed with different amounts of support members 65, 60.

The left angle arm 40 and the right angle arm 35 have an outer edge 75 that is substantially rigid and straight. The outer edge 75 of the left angle arm 40 and the right angle arm 35 is placed adjacent to the objects that require the determination of the angle there between.

Although the adjustable angle/miter indicator 100 is shown as being configured to be utilized to measure the inside angle of two adjacent objects, it is further contemplated within the scope of the present invention that the adjustable angel/miter indicator 100 could be configured to measure the angle area outside two adjacent objects. Furthermore, although no specific range of angle measurement is required, good results have been achieved with an angle/miter indicator 100 constructed to measure the angles between the range of zero degrees and one hundred and eighty degrees.

It is contemplated that additional functionalities could be added to angle/miter indicator 100 to increase the overall usefulness of angle/miter indicator 100. For example, but not by way of limitation, a level, such as a bubble level and/or a laser pointer could be integrated into base 10 to give added functionality to angle/miter indicator 100.

Referring in particular to FIG. 1, a description of the operation of the adjustable angle/miter indicator is as follows. In use, a user will place the outer edge 75 of the left angle arm 40 and the right angle arm 35 adjacent to two objects for which the angle there between needs to be determined, such as the corner of a wall or the peak of a roof. As the user places the right angle arm 35 and the left angle arm 40 adjacent to the two objects the end 41 of the left angle arm 40 and the end 36 of the right angle arm 40 that are pivotally mounted to the end 13 of the base member 10 pivot to accommodate the angle of the two adjacent objects. As the right angle arm 35 and the left angle arm 40 pivot to accommodate the two adjacent objects, the left support member 65 and the right support member 60 pivot on the left angle arm 40 and the right angle arm 35. The ends 61, 66 of the left support member 65 and the right support member 60 mounted to the coupling 30 slidably move along the channel 15 on the base member 10 as the right angle arm 35 and left angle arm 40 are positioned to measure the angle of the two objects adjacent to the outer edge 75. Once the desired position has been achieved, the pointer 80 is aligned with the degree marker indicators 20 that indicate the degree of the angle between the two adjacent objects. On the opposite side of the channel 15 adjacent to the pointer 80 is the miter angle indicator 25 that functions to identify the miter cut angle needed to create the measured angle if desired. For example, if the angle between the two adjacent objects is approximately forty-five degrees as indicated by the pointer 80 position, the pointer will be adjacent the miter angle indicator 25 that identifies the necessary miter angle cut of twenty-two and a half degrees to be cut on two pieces of material to form the measured angle.

Although a preferred embodiment of angle/miter indicator 100 is described herein to be used to measure the angle of a corner and corresponding miter, it is contemplated to be within the scope of this invention that angle/miter indicator 100 could be used to measure angles is many other environments, such as, but not by way of limitation to measuring the angles of bends in tubing and pipes.

In the preceding detailed description, reference has been made to the accompanying drawing that forms a part hereof, and in which is shown by way of illustration a specific embodiment in which the present invention may be practiced. This embodiment, and certain variants thereof, have been described in sufficient detail for those skilled in the art to practice the present invention. It is to be understood that other suitable embodiments may be utilized and that logical changes may be made without departing from the spirit or scope of the present invention. The description may omit certain information known to those skilled in the art. The preceding detailed description, is therefore, not intended to be limited to the specific forms set forth herein, but on the contrary it is intended to cover such alternatives, modifications, and equivalents as can be reasonably included within the spirit and scope of the appended claims.

What is claimed is:

1. An apparatus for determining the angle between two adjacent objects comprising:
    a base, said base being configured in a substantially planar manner, said base being generally rectangular in shape; said base further comprising a channel, said channel including angle degree markings positioned adjacent one side and miter angle markings positioned adjacent opposite said degree markings;
    a first arm and a second arm, each of said first and second arms being pivotally mounted to said base, each of the first and second arms for engaging the adjacent objects;
    a first support member having a first end and a second end, said first end of said first support member pivotally connected to said first arm;
    a second support member having a first end and a second end, said first end of said second support member pivotally connected to said second arm; and
    said second end of said first support member pivotally connected to said second end of said second support member proximate said base and at a position relative to said base that varies in response to the pivoting of said first arm and said second arm;
        said second end of said first support member comprising a pointer for indicating one of a measured angle or miter angle and said second end of said second support member comprising a pointer for indicating one of a measured angle or a miter angle.

2. The apparatus as recited in claim 1, and further comprising a coupling, said coupling configured to receive said second end of said first support member and said second end of said second support member, said coupling further slidably mounted to said base.

3. The apparatus as recited in claim 2, wherein said channel is configured to receive a portion of said coupling, said channel being further configured to slidably engage with said coupling.

4. The apparatus as recited in claim 1, wherein said arms further comprise measurement markings, said measurement markings for measuring at least a portion of the length of an object.

5. The apparatus as recited in claim 4, wherein said base, said first and second arms, and said first and second support members, are comprised at least one of metal, plastic and wood.

6. An apparatus for determining the angle between two adjacent objects comprising:
    a base member, said base member being configured in a substantially planar manner, said base member being generally rectangular in shape, said base member having a first and second end; said base member further includes a plurality of angle degree markings, said angle degree markings positioned along said channel;
    a channel, said channel centrally positioned longitudinally in said base member, said channel traversing from said first end of said base member to said second end of said base member;
    at least a first arm and a second arm, each of said first arm and said second arm having a first end and a second end, each of said first ends of said first and second arms being pivotally mounted to said first end of said base member, said first and said second arms for engaging the two adjacent objects; and
    at least a first support member and a second support member, each of said first support member and said second member having a first end and a second end, said first end of said first support member pivotally mounted to said first arm, said first end of said second support member pivotally mounted to said second arm;
    said second end of said first support member being pivotally mounted to said second end of said second support member; and
    said second end of said first support member and said second end of said second support member being slidably mounted to said base member
    a first pointer adjacent said second end of said first support member and operable to indicate at least one of the degree of angle of said arms and the angle of the appropriate miter cut; and
    a second pointer adjacent said second end of said second support member and operable to indicate at least on of the degree of angle of said arms and the angle of the appropriate miter cut.

7. The apparatus as recited in claim 6, and further comprising a coupling, said coupling for pivotally securing said second end of said first support member with said second end of said second support member, said coupling further slidably mounted within to said channel.

8. The apparatus as recited in claim 6, wherein said arms further include a plurality of measurement markings, said measurement marking disposed substantially along said arms, said measurement markings for measuring at least a portion of said adjacent objects.

9. An apparatus for engaging at least a portion of two adjacent objects and determining the angle there between and the appropriate miter angle comprising:
    a base member, said base member being configured in a substantially planar manner, said base member being generally rectangular in shape, said base member having a first and second end, said base member having at least one longitudinal edge;
    a plurality of angle degree marking indicators, said degree marking indicators substantially disposed along said base member proximate the longitudinal edge;
    a plurality of miter angle indicators, said miter angle indicators substantially disposed alone said base member opposite said channel from said angle degree marking indicators;
    a channel, said channel centrally positioned longitudinally on said base member, said channel substantially disposed along the entire length of said base member;
    two arms, said arms having a first end and a second end, said first end of said arms being pivotally mounted to said first end of said base member, said arms extending laterally away from said base member opposite each other, said arms further including an outer edge, said outer edge being configured to be substantially straight, said outer edge of said arms for engaging said adjacent objects,
    two support members, said support members having a first end and a second end, said first end of said support members being pivotally mounted centrally on said arms, said second ends of said support members being pivotally mounted superposed each other to said base member, said second ends of said support members further being configured to create a pointer, said second end of said support members further being slidably mounted to said base member.

10. The apparatus as recited in claim 9, and further including a coupling, said coupling being configured to pivotally secure said second ends of said support members superposed each other, said coupling being further configured to slidably engage said second ends of said support members with said channel on said base member.

11. The apparatus as recited in claim 9, and further including a plurality of measurement markings, said measurement marking disposed substantially along said arms, said measurement markings for measuring at least a portion of said adjacent objects.

12. The apparatus as recited in claim 11, wherein said apparatus is manufactured from a group of materials consisting of wood, plastic or metal.

* * * * *